Figure 4:
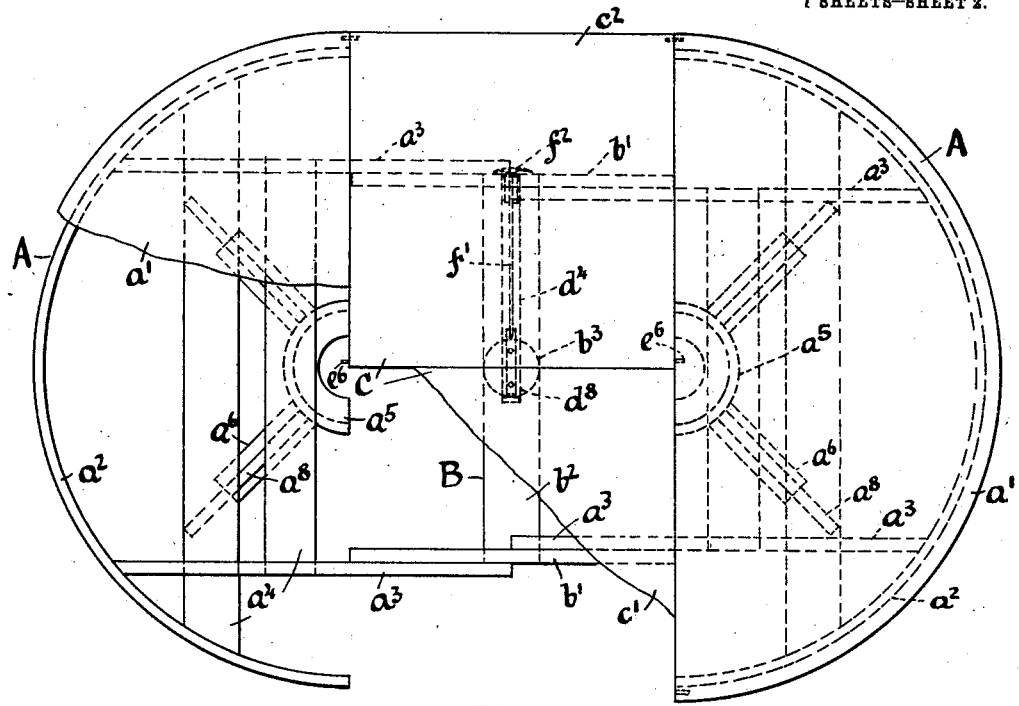

C. MOSCH.
EXTENSION TABLE.
APPLICATION FILED MAY 20, 1909.
998,110.
Patented July 18, 1911.
7 SHEETS—SHEET 1.
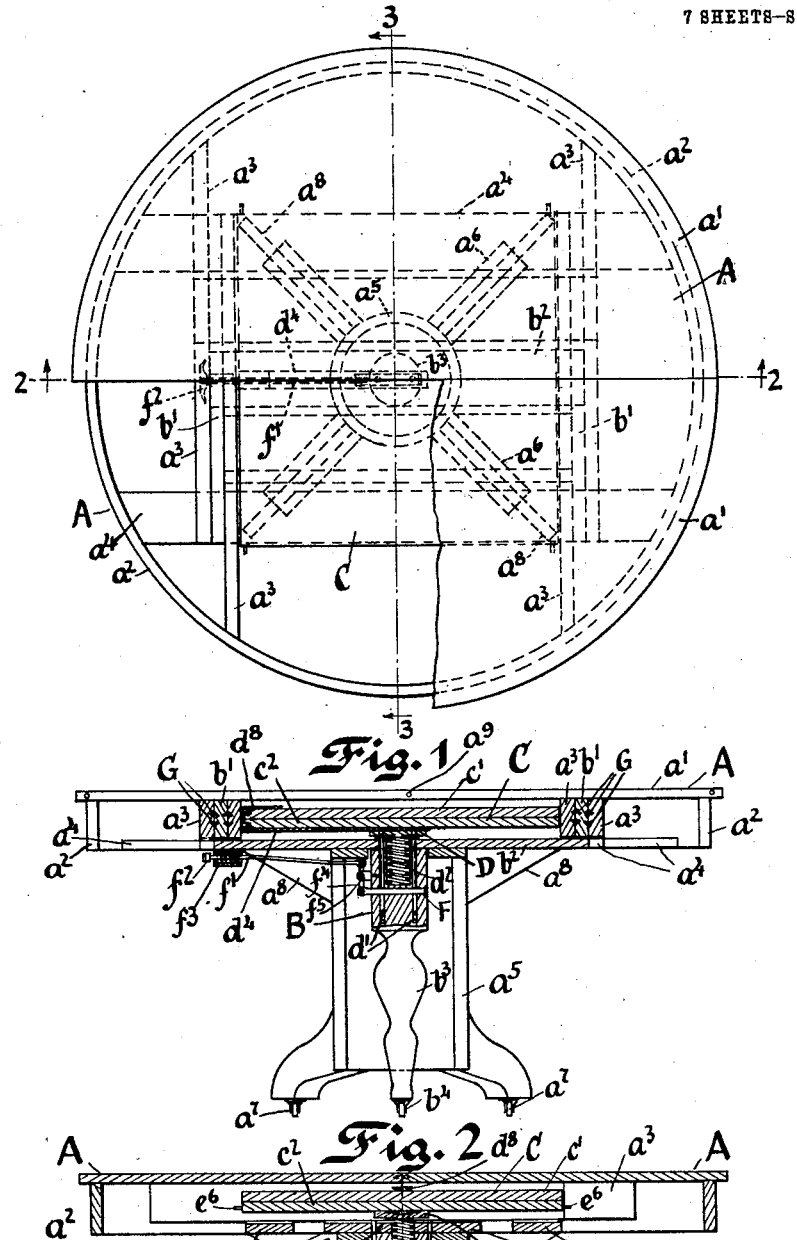

C. MOSCH.
EXTENSION TABLE.
APPLICATION FILED MAY 20, 1909.

998,110.

Patented July 18, 1911.

7 SHEETS—SHEET 2.

Witnesses

Charles Mosch, Inventor

By

Attorney

C. MOSCH.
EXTENSION TABLE.
APPLICATION FILED MAY 20, 1909.
998,110.
Patented July 18, 1911.
7 SHEETS—SHEET 3.
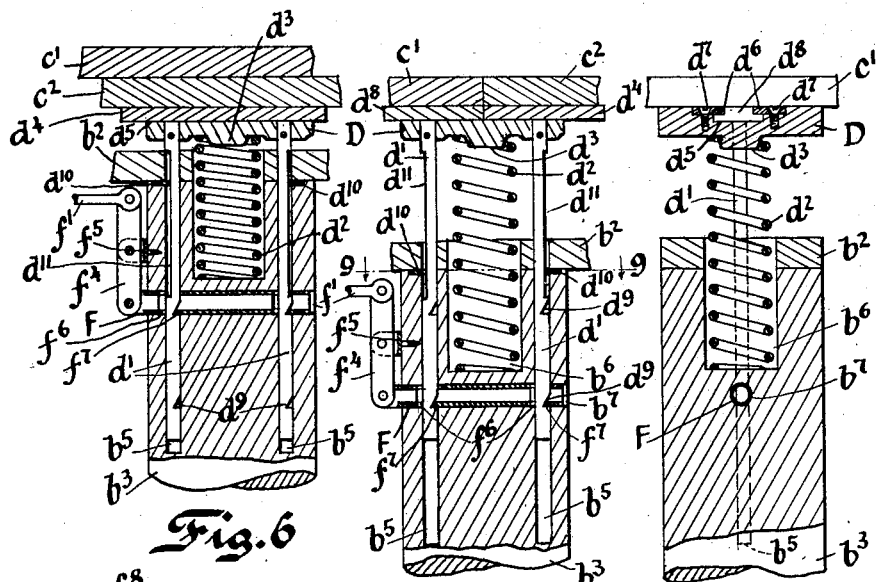
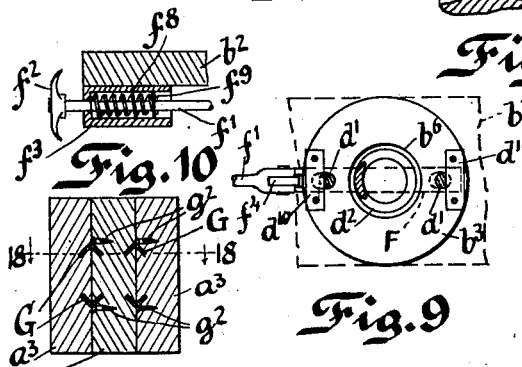
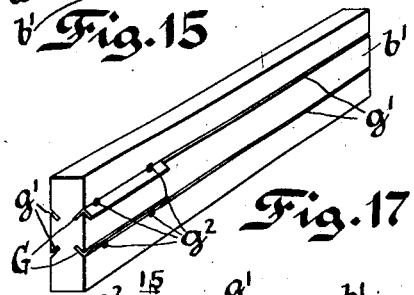
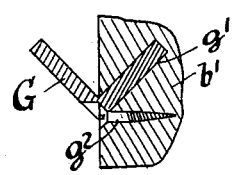
Charles Mosch, Inventor
Witnesses
By George Wetmore Colles, Attorney

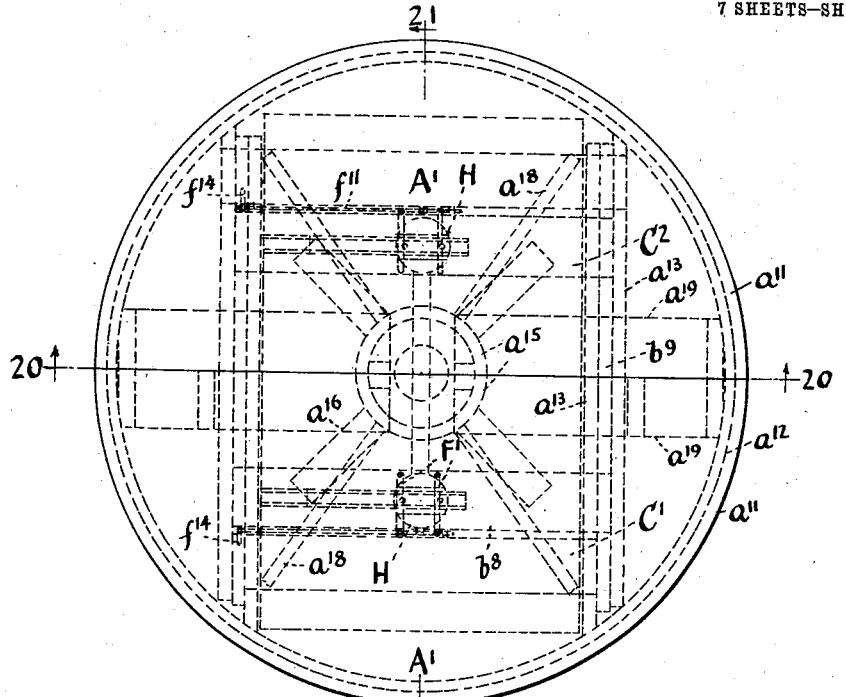
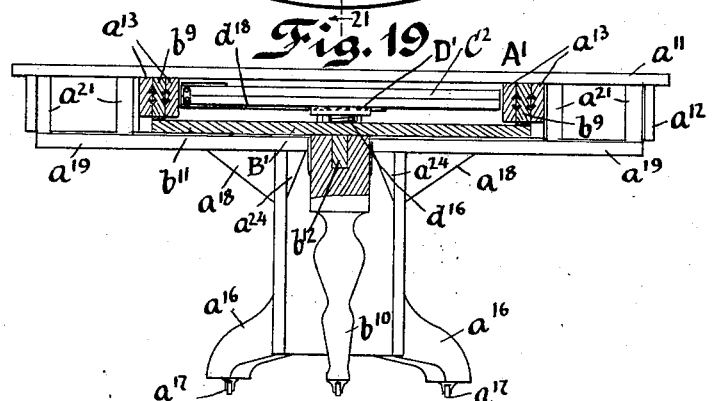
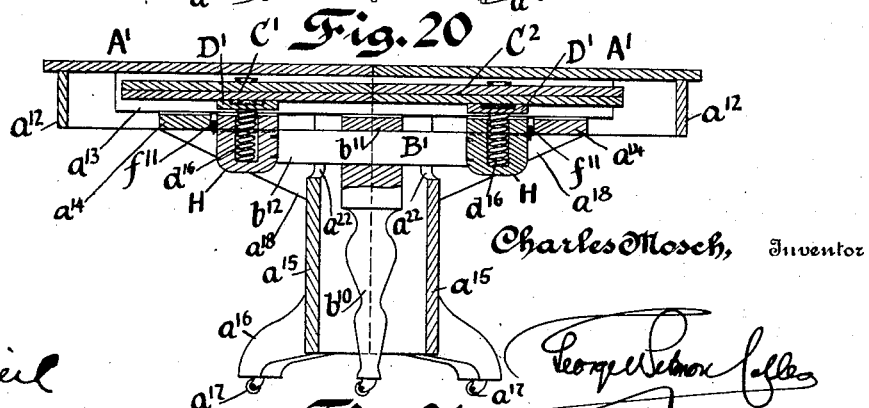

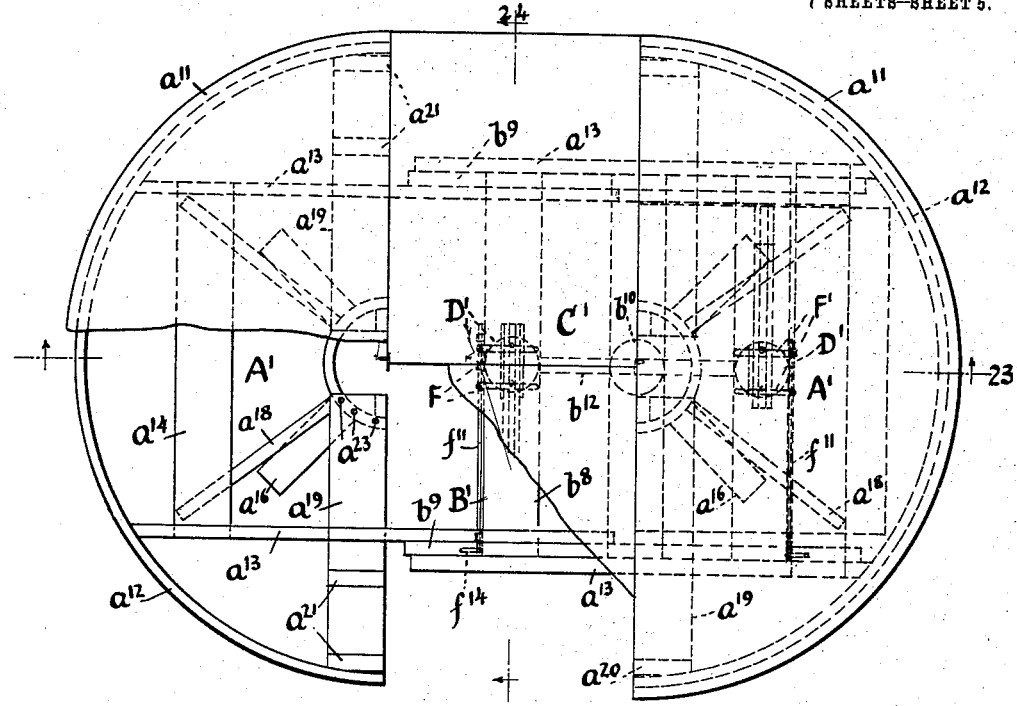

C. MOSCH.
EXTENSION TABLE.
APPLICATION FILED MAY 20, 1909.
998,110.
Patented July 18, 1911.
7 SHEETS—SHEET 6.
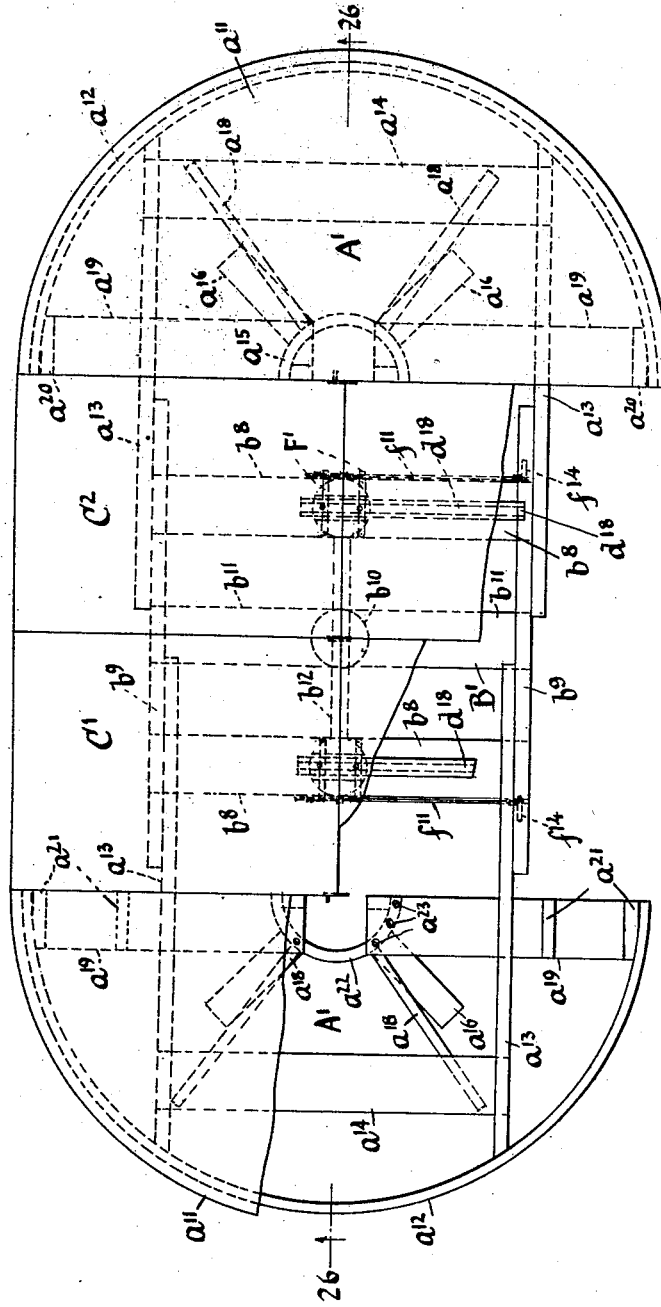
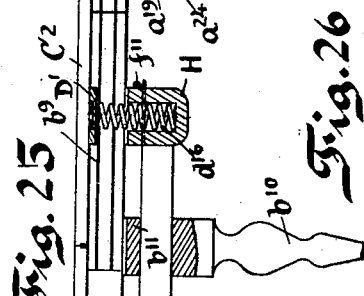
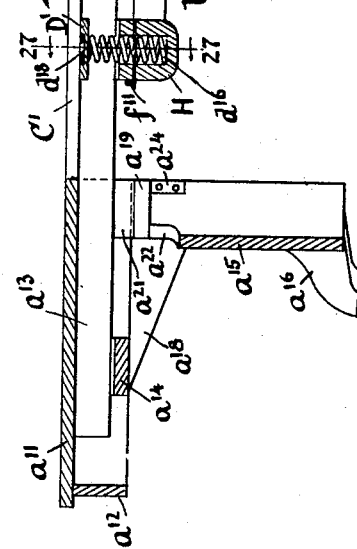
Charles Mosch, Inventor
Witnesses
Attorney

C. MOSCH.
EXTENSION TABLE.
APPLICATION FILED MAY 20, 1909.

998,110.

Patented July 18, 1911.
7 SHEETS—SHEET 7.

Charles Mosch, Inventor

Witnesses

Attorney

COLUMBIA PLANOGRAPH CO., WASHINGTON, D. C.

UNITED STATES PATENT OFFICE.

CHARLES MOSCH, OF MILWAUKEE, WISCONSIN.

EXTENSION-TABLE.

998,110.

Specification of Letters Patent. Patented July 18, 1911.

Application filed May 20, 1909. Serial No. 497,262.

*To all whom it may concern:*

Be it known that I, CHARLES MOSCH, of Milwaukee, Wisconsin, have invented an Extension-Table, of which the following is a specification.

This invention relates to extension-tables of the center-post or pedestal type; and the object of my invention is to provide a table of circular form, supported by a pedestal, with an extension-leaf which folds under the top-boards of the table and is permanently mounted in place; said extension-leaf being adapted to be unfolded and set in position and to be continuous with the top-boards of the table when the latter are drawn out.

According to my invention I provide a hollow pedestal divided longitudinally into halves and inclosing the central leg which acts as a support for the middle part of the table when the two halves are drawn out. This center-leg supports a center-frame on which is mounted an extension-leaf which is divided transversely, one half folding over the other; the leaf when so folded being short enough to sit between the extension-slides of the table; and I provide a rising and falling platen which is mounted on said center-frame and is supported by a spring, and which engages slidably with the under side of the extension-leaf; and in connection with the spring I provide latch-devices for holding said platen depressed until released by disengaging it from these devices, said latch-devices being also adapted to hold the extension-leaf at the proper height when in use.

Another feature of my invention consists in the improved hinge by which the two halves of the extension-leaf are united, said hinge being provided with a pin which acts conjointly as a pivot for the hinge-plate and also as a dowel to engage in a hole in the top-board of the table and hold the extension-leaf in proper relationship thereto.

Another feature of my invention consists in the improved construction of table-slides whereby they can be constructed at a greatly reduced cost and with a superior efficiency and strength.

Other features of my invention will appear hereinafter from the detailed description, and are particularly set forth in my claims.

Figure 5:
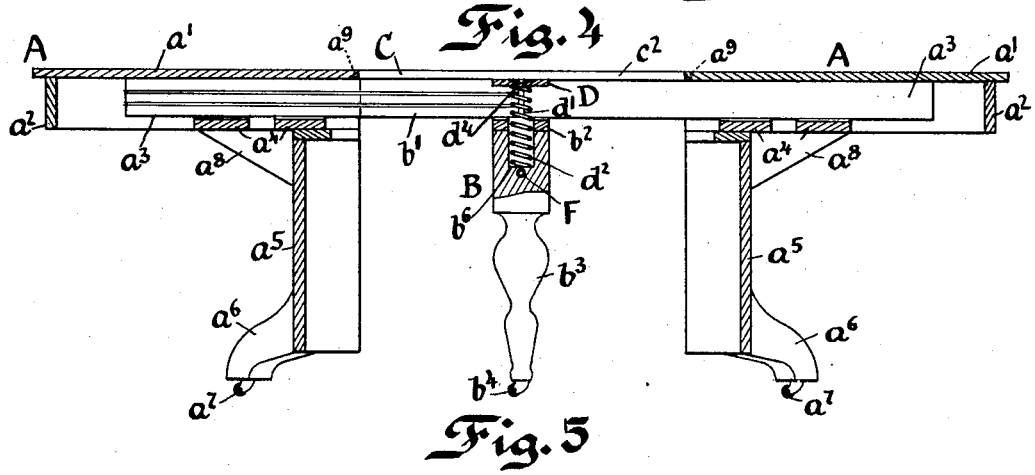
Figures 27, 28, 29:
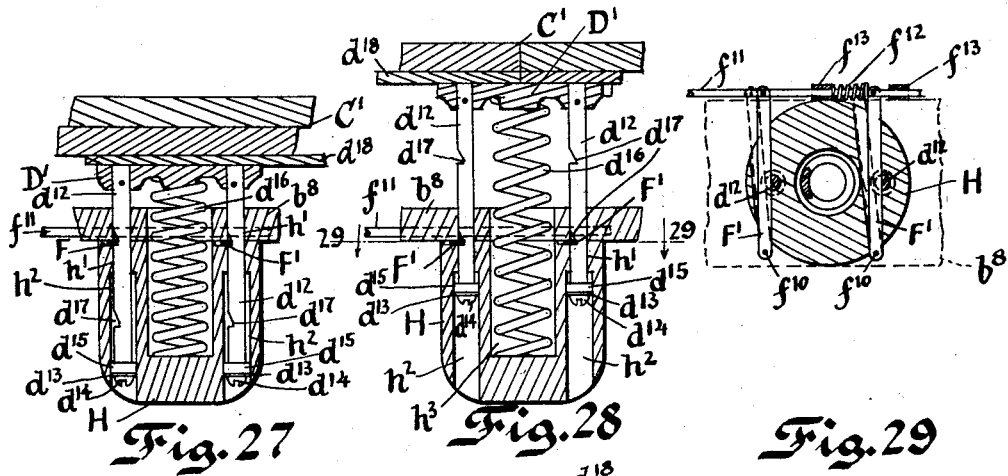
Figure 30:
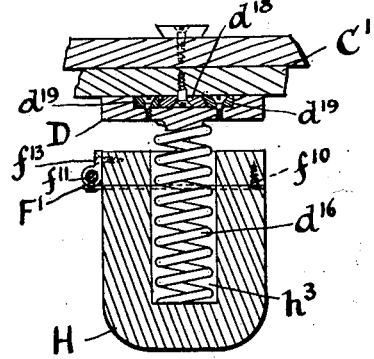
Figure 31:
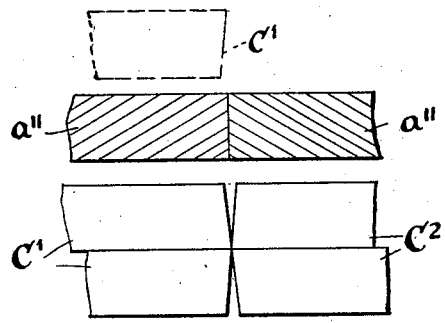

In the drawings accompanying this specification Figure 1 is a plan view of a table constructed according to my invention, in the closed position, a part of one of the top-boards being broken away; Fig. 2 is a vertical axial section thereof on the plane 2, Fig. 1; Fig. 3 is a vertical axial section of the same upon the plane 3, Fig. 1; Fig. 4 is a plan-view of the table in its extended position, a part of one top-board and the extension-leaf being broken away. Fig. 5 is a longitudinal axial section through the table in an extended position; Fig. 6 is a detail-view on a larger scale of the mechanism supporting the center-leaf, being a longitudinal section thereof on the plane 2, Fig. 1, the platen and leaf being shown in depressed position. Fig. 7 is a similar detail-view showing the platen raised and the leaf extended. Fig. 8 is a detail sectional view of the same parts on the plane 3, Fig. 1, showing the platen raised and the leaf extended; Fig. 9 is a plan section of the same on the plane 9, Fig. 1; Fig. 10 is a detail view of the end of the operating-rod and handle, being a longitudinal section on the plane 2, Fig. 1; Fig. 11 is an elevation of the hinged edge of the extension-leaf, showing it in folded position. Fig. 12 is an elevation of the same parts in a plane at right angles to that of Fig. 11. Fig. 13 is a similar view of the same parts after unfolding the upper leaf-half, and before pushing it up against the lower half. Fig. 14 is a similar view of the same parts after the two halves of the leaf have been pushed together. Fig. 15 is a transverse section on the plane 15, Fig. 18, of the table-slides, to show the construction of the engaging elements. Fig. 16 is a fragmentary cross-section of a portion of one of the slides on a larger scale, to illustrate the manner of fixing the angle-bar which forms the engaging element; Fig. 17 is a perspective view of one of the slides; and Fig. 18 is a plan section through two of the slides on the plane 18, Fig. 15, showing the engaging angle-bars in elevation. Fig. 19 is a plan, and Figs. 20 and 21 axial sections on the planes 20 and 21, Fig. 19, respectively, of a table provided with two extension leaves, in its closed position; Fig. 22 is a plan, and Figs. 23 and 24 axial sections on the planes 23 and 24 respectively, Fig. 22, of the same table in its first position of extension; Figs. 25 and 26 are respectively a plan and a longitudinal section on the plane 26, Fig. 25, of the same table in its fully extended position; Figs. 27 and 28 are axial sections on the plane 27, Fig. 26, of the leaf-mounting and elevating-mechanism for this table, respectively in the lowered and raised positions; Fig. 29 is a plan section of the same on the plane 29, Fig. 28; Fig. 30 is a vertical axial section of the same on the plane 21, Fig. 19; and Fig. 31 is a fragmentary side view of the adjacent edges of the leaves in the double form.

In the several plan views portions of the leaves and top-boards are shown as broken away in order to disclose the construction of the parts beneath.

In these drawings the same part is designated by the same reference-letter or numerals in each figure.

The simpler or single extension form of table, Figs. 1 to 18, is constructed of two halves or members A, each consisting of a top-board $a'$, edge-board $a^2$, a pair of supporting slide-bars $a^3$ secured to the bottom of the top-board, cross-planks $a^4$ secured to the lower edges of said slides, a semi-circular pedestal-half $a^5$ secured to one of the planks $a^4$, and feet $a^6$ on the pedestal-half, provided if desired with casters $a^7$. Bracket arms $a^8$, extending radially to the outer plank $a^4$, are also provided to support the overhanging portion of the table-top.

The slide-bars $a^3$ on one of the halves A are, as will be seen from Figs. 1 and 2, mounted inside the bars on the other half, and a third pair of slides $b'$ are interposed between them, said slides forming a part of the intermediate frame B, which comprises, in addition to said slides, the cross-plank $b^2$ centrally connecting them, and the center-leg $b^3$, which is centrally mounted on the plank $b^2$ and inclosed within the pedestal-halves $a^5$ in their closed position, and which may be likewise provided with a caster $b^4$.

The extension-leaf C is in two halves $c'$, $c^2$, pivotally connected at their meeting edges by means of my improved hinges, which are shown in Figs. 11 to 14 inclusive, and will be described hereinafter; and the half $c^2$ is slidably mounted upon a platen D, on which is mounted a pair of depending guide-posts $d'$ sliding in vertical bores $b^5$ in the center-leg $b^3$, one bore on each side of the center; and the upper end of the leg $b^3$, is hollowed out centrally at $b^6$ to receive a coiled compression-spring $d^2$ which rests on the bottom of the recess $b^6$ and presses on the under side of the platen D, which is preferably provided with a central boss $d^3$ to hold the spring in place. It will be understood that the strength of the spring $d^2$ is sufficient to raise and support the platen D and the weight of the parts carried thereby.

The means for slidably engaging the extension-leaf with the platen consists preferably of a T-shaped tenon $d^4$, which may be either of wood or metal, but preferably of metal, secured to the under-side of the leaf-half $c^2$ and sliding in a groove $d^5$ in the top-face of the platen, which groove is flanked by a pair of metal plates $d^6$ engaging over the projecting flanges of said tenon and secured by screws $d^7$ or other suitable means; and the leaf-half $c'$ has also upon its under surface (meaning the surface which is below when the leaf-half is unfolded) a short tenon $d^8$ of the same cross-section, which with the leaf unfolded is continuous with the tenon $d^4$, and holds the two leaves in rigid alinement when they are in the position of use.

The peculiar form of hinge which I have devised for the use of this invention comprises, first, an angle-plate $e'$ secured to the edge of the leaf-half $c^2$, and having at the lower corner a snug $e^2$ formed thereon; and a hinge-plate $e^3$, which is pivoted at one end upon a screw or pin $e^4$ in the edge of the upper leaf-half $c'$ and whose other end is provided with a slot $e^5$ which is shiftable upon a screw-pin $e^6$ secured in the edge of the leaf and passing through a hole in the plate $e'$. The screw pin $e^6$ is provided with an elongated head as shown, which acts as a dowel by engaging in a suitable hole in the edge of the top-board $a'$, and thereby holds the extension-leaf in alinement with the top-board at the joint.

The latch-device for holding the leaf and platen depressed comprises a latch-bar F mounted in a transverse bore $b^7$ in the center-leg $b^3$, said bore crossing the two bores $b^5$; an operating-rod $f'$ having a handle $f^2$ at one end and supported at this end in a housing $f^3$ on the lower side of the cross-plank $b^2$; and a connecting lever $f^4$ pivotally mounted on a fulcrum-piece $f^5$ on the side of the leg $b^3$ and connected at one end to the operating rod $f'$ and at the other to the latch-bar F, as shown. The latch-bar F is made tubular merely for the purpose of convenience and saving in weight and material, and might equally well be solid. It has two transverse slots $f^6$ through which pass the rods $d'$, and these latter have each a pair of oblique-faced notches $d^9$ adapted to engage with one edge $f^7$ of the slots $f^6$ as shown; and a spring is applied to hold the latch-rod F in resilient engagement with the notches $d^9$ in the manner shown in Figs. 6 and 7; said spring here taking the form of a coiled compression-spring $f^8$ within the housing $f^3$ and abutting on one end upon the end of the bore of the housing and upon the other end upon a washer or shoulder $f^9$ fixed upon the rod $f'$; so that whenever the handle $f^2$ is pulled out against the pressure of the spring, the latch-bar F is operated to release the rods $d'$ and allow the platen and leaves to be raised by the spring $d^2$; and when the handle $f^2$ is released the spring $f^8$ restores the latch-bar to engagement with the notches $d^9$.

The two notches $d^9$ are placed respectively in such positions as to hold the extension-leaf in folded position under the table and in the unfolded position of use, wherein it is flush with the top-boards of the table, but it should be understood that the platen is capable of a somewhat greater rise for the greater ease of the working of the table; the upward movement being limited by a pair of stop-plates $d^{10}$ secured to the cross-plank $b^2$ in position to engage in flats $d^{11}$ cut in the sides of the guide-posts $d'$, and limiting the elevation of the platen by striking the ends of said flats.

The operation of placing the extension-leaf in position of use is as follows: The two halves A are first drawn apart, the central frame B standing midway between them and leaving free the leaf C, which lies between the slides $a^3$. This also exposes the handle $f^2$, which is pulled to release the platen, which, with the extension-leaves, is then raised by the spring $d^2$ clear of the slides and top-boards. The upper leaf-half $c'$ is now unfolded, being pulled so as to draw out the hinge-plate $e^6$ to the end of the slot $e^5$, as indicated by the dotted lines in Fig. 11; when fully opened, as in Fig. 13, the leaf-half $c'$ is then pushed up against the leaf-half $c^2$, in the position shown in Fig. 14; the snug $e^2$ offering a support for the half $c'$ to prevent it from falling below the level of the half $c^2$. By further pushing upon the half $c'$, the entire leaf is brought to central position, the tenon $d^4$ sliding in the groove $d^5$ of the platen until each half is supported by the platen; and as the tenons $d^4$ and $d^8$ now both engage in the groove $d^5$, the two halves are held rigidly in alinement. Lastly, the two halves A of the table are pushed together until the opening is closed, the screw-heads $e^6$ entering the dowel-holes $a^9$ in the edges of the top-boards and thus aiding to support the leaf and hold it in alinement.

My improved construction of slides is shown in detail in Figs. 15 to 18 inclusive. Heretofore slides have been made to engage with each other by flanged tenons and undercut grooves, which construction is expensive because difficult to form and wasteful of material; but I have succeeded by my present construction in providing a sliding engagement by using ordinary rectangular slots, and at the same time providing a stronger construction. In such engaging face of the slides $a^3$ and $b'$ are formed two oblique grooves $g'$, the obliquity of said grooves being opposite and the plane of said grooves preferably 45 degrees to the surface of the slide. At one end of the grooves on one face of one slide are set two short angle-bars G, which are held in place by pins or screws $g^2$ set across their angular edges, as clearly shown in Figs. 16 and 17; and a similar pair of angle-pieces are set at the opposite end of the opposing face of the adjacent slide, leaving between the two pairs of angle-pieces an interval equal to the distance which the slides can be drawn out, as illustrated by the dotted-line position of Fig. 18. The groove $g'$ can be cut on an ordinary molding or grooving-machine, and can be cut continuously in strips which are cut to length afterward; and the angle-pieces G, being of metal, offer rigid and unyielding supports which are considerably stronger than wooden tenons.

In the second or two-extension-leaf form of my table, Figs. 19 to 30 inclusive, the construction is substantially the same with the exception of the arrangement of the leaves; comprising the two halves A', each consisting of a top-board $a'$, edge-board $a^{12}$, slide-bars $a^{13}$, cross-plank $a^{14}$, pedestal-half $a^{15}$, feet $a^{16}$, casters $a^{17}$, and bracket arms $a^{18}$; but as in this form a clear opening must be left through the pedestal and its support, for the passage of the leaf-mounting in the opening and closing movements of the table, the inner cross-plank $a^4$ of the first form is replaced by a pair of bracket-planks $a^{19}$ which are rigidly fixed to the under side of the table. The bracket-planks $a^{19}$ on the right-hand side in the drawings are secured to the edges of the outer slides $a^{13}$ which are fixed to this half, and to a pair of blocks $a^{20}$ which are secured to the lower side of the top-board; and the bracket-planks $a^{19}$ of the left-hand half are in like manner mounted on a pair of edgewise-set blocks $a^{21}$ which are positioned outside the slides so as not to interfere therewith. The inner ends of these planks $a^{19}$ approach one another, leaving a distance of a few inches between them, sufficient to pass the rest-blocks H for the leaf-mountings between them; said rest-blocks being each mounted on a cross-plank $b^8$, which forms part of the central frame B', and is secured at its ends to the middle slides $b^9$. There are two rest-blocks H, each supporting a leaf C', C², and they are placed on opposite sides of the center-leg $b^{10}$, which is secured to the cross-plank $b^{11}$ of the frame B' and is preferably connected with the rest-blocks H by an edgewise-set longitudinal beam $b^{12}$ to strengthen and rigidify the whole. The adjacent edges of the two leaves are slightly beveled or chamfered on their under sides to permit of their passing one another readily in the raising and lowering movements, as shown in Fig. 31.

Each pedestal-half $a^{15}$ has its upper portion cut away in the center as shown at $a^{22}$ to pass the corresponding rest-block H therethrough, and is secured, as by screws $a^{23}$, to the corresponding bracket-plank $a^{19}$, and the joint may be strengthened by triangular gussets $a^{24}$ secured to both pieces. These are details of construction which may be varied somewhat without interfering with the general arrangement.

The rest-blocks H are so placed that the leaves C', C² shall be side by side in position of use, but the action of said leaves is independent so that either one leaf alone can be used (Figs. 22 to 24) or both leaves together (Figs. 25 and 26). The mountings of the leaves may be the same as heretofore described, but they are preferably adapted to this special construction as illustrated in Figs. 27 to 30. In this construction the platen D' on which the leaves are mounted is provided with depending posts $d^{12}$ which run in sockets $h'$ in the support, and the lower ends of these sockets are bored out to a larger diameter, as shown at $h^2$, and upon the lower end of each post is mounted a washer $d^{13}$, secured in place by a screw $d^{14}$, and supporting a rubber pad $d^{15}$ by which the termination of the upward stroke is cushioned. The upward stroke is limited by the striking of the pads $d^{15}$ on the upper ends of the bore $h^2$, this accomplishing the same effect as the plates $d^{10}$ of the first form, but in a somewhat simpler manner. The raising of the platen and leaf is effected by a coiled-spring $d^{16}$ seated in a recess $h^3$, as previously described.

Instead of the form latch-mechanism of Figs. 6 to 10 inclusive, I have here provided a somewhat simpler form, comprising a pair of latch-bars F' which have a pivotal movement in a plane transverse to the axis of the posts $d^{12}$, being pivoted upon pins $f^{10}$ at one end and connected at the other to the operating-rod $f^{11}$. The edges of the latch-bars F' engage in notches $d^{17}$ in the posts $d^{12}$ and are resiliently maintained in engagement therewith by the action of a spring $f^{12}$ mounted on the rod $f^{11}$ and which may abut at one end against one of two bearing-blocks $f^{13}$ and upon the other upon one of the latch-bars F' as shown. The other or free end of the rod $f^{11}$ extends to the side of the table, or rather to a point underneath one of the slides $b^9$, and is provided with a handle $f^{14}$. A somewhat different form of the tenon and groove engagement between the leaf and platen is illustrated in Fig. 30. The tenon $d^{18}$ is here made of dovetail-shape and the side plates $d^{19}$ to correspond. The remaining details of construction as shown are substantially the same as previously described.

While I have hereinabove shown the most improved form of my invention, I wish it understood that not all of the features are essential thereto or necessarily made in the exact form shown, but various changes and modifications in the constructions as herein shown may be made without departing from the spirit of my invention.

Although the invention is particularly adapted to circular pedestal-tables, the top may be made in square, oval, round-cornered or other forms, and the central pedestal replaced by legs otherwise placed, without changing in any way the construction of the essential elements. In the multiple-leaf form, the number of leaves is not restricted to two, but may be increased as desired by appropriate adaption of form and dimensions.

Having thus described my invention, what I claim as new and desire to secure by Letters Patent is:

1. A circular pedestal-extension-table formed in two extendible halves each comprising a top-board and a semi-cylindrical hollow pedestal, a central frame having a center-leg which is inclosed by the two pedestals in the closed position of the table, a pair of slides mounted on each table-half, and a third pair of slides mounted on said central frame, said three pairs of slides uniting said table in an extendible manner, a rising-and-falling platen mounted upon said central frame, a spring resiliently raising said platen, latch-mechanism for maintaining said platen depressed against the effort of said spring, a handle at the side of the table operatively connected with said latch-mechanism for releasing said platen, and an extension-leaf divided transversely into two halves one of which is hinged to the other and said halves being adapted when folded to sit between said slides and below the top-boards of the table in the depressed position of the platen and in the raised position of the platen to lie at a level with said top-boards; the lower half of said leaf having a sliding engagement with said platen whereby it may be shifted to bring the leaf into central position with respect to the table both in folded and unfolded position.

2. A mounting for an extension-leaf for extension-tables comprising, in combination, a supporting member having a pair of vertical bores therein, said bores being supplemented by bores of larger diameter at their lower ends, a platen having a pair of depending guide-posts sliding in said first-named bores, and a pair of disks mounted on the lower ends of said guide-posts and sliding in said last-named bores whereby the upward movement of said platen is limited.

3. A mounting for an extension-leaf of extension-tables comprising a supporting member having guide-sockets, a platen having a pair of notched guide-posts depending therefrom and sliding in said sockets, a pair of pivoted latch-bars engaging the notches of the respective posts, means for holding said latch-bars normally in engagement with said notches; and means for manually withdrawing said latch-bars from said notches.

4. In combination with a supporting member for an extension-table, a vertically movable platen mounted on said member, and an extension-leaf in two halves one of which is hinged to the other and foldable thereover; said leaf and platen having a tongue-and-groove sliding-engagement one with the other in a lateral direction with respect to the table-extension.

5. The combination with the two table-halves extendibly connected, each half having a central pedestal-half and a pair of slides secured thereto, of a central frame having a third pair of slides and slidably mounted between the slides of said table-halves and a central supporting-leg adapted to be inclosed within said pedestal-halves in the closed position of the table; a pair of extension-leaves mounted side by side upon said central frame, each leaf being divided transversely and adapted when unfolded to lie level with the top-boards and when folded to lie beneath said top-boards and between the slides, and vertically movable mountings for said leaves; the two leaves being adapted to be operated independently.

6. In an extension-table, the combination with the two halves having a slidable relation one with the other, of an extension-leaf permanently connected with said halves, and means for moving said leaf in a vertical direction parallel to itself; said leaf being transversely divided and one half hinged to and folding over the other; and said leaf being adapted when raised to lie flush with, and when lowered to lie below, the aforesaid halves; said extension-leaf having further a lateral sliding movement.

7. In an extension-table, the combination of an extension-leaf in two halves one of which is hinged to and foldable over the other, each half having on its under side a tenon, said two tenons being alined with one another, and a member having an undercut groove formed in which the tenon on the second half of the extension-leaf slides and in which the tenon on the first half of said extension-leaf is adapted to slide when unfolded.

8. In an extension table, the combination with the two halves having a slidable relation one with the other of a floating extension-leaf permanently connected with said halves and normally disposed below and between them; said extension-leaf being divided transversely and having one portion hinged to and folding over the other; and means for giving to said extension-leaf when said two halves are drawn apart from one another first a rising and secondly a laterally sliding movement whereby said extension-leaf when unfolded is moved into registration with said halves.

9. In an extension-table, in combination with a supporting member having vertical bores, a platen having depending guide-posts fitting and sliding in said bores, a coiled compression-spring mounted under the center of said platen and adapted to raise the same when released, said post having notches therein corresponding to predetermined positions of elevation of said platen, one or more latch-bars engaging said notches to hold said platen against the upward pressure of the spring, and means for shifting said latch-bar or bars to release said platen.

10. The combination with the two halves extendibly mounted, of a frame having a slidable relation with the respective said halves and adapted to occupy a position midway between them, a vertically moving platen mounted on said center-frame, and an extension-leaf having a transversely sliding engagement with said platen; said leaf being formed in two halves, one of which is foldable over the other, and the leaf when so folded being adapted to sit below the top-boards of the table and when unfolded on a level therewith.

11. In an extension-table, the combination with the two halves slidably connected, of a vertically moving support connected with said halves and disposed between them, a latch-mechanism adapted to releasably hold said support in the depressed position, means for resiliently raising said support when released, a transversely divided extension-leaf one half of which is hinged to and foldable over the other non-rotatably mounted on said support, and a handle operatively connected with said latch-mechanism and located at the side of the table.

12. In an extension-table, the combination with the two halves slidably connected and a vertically movable support slidably connected with both halves and positioned between them, of a latch-mechanism adapted to releasably hold said support depressed, means for resiliently raising said support when released, and an extension-leaf nonrotatably mounted on said support and transversely divided into two halves one of which is hinged to and folds over the other.

13. In an extension-table, the combination with the two halves slidably connected, of a frame slidably connected with both halves and disposed between them, a transversely divided leaf, one-half being foldable over the other, a rising and falling mounting on which said leaf is slidably mounted, a latch-mechanism adapted to releasably hold said platen depressed, and a handle operatively connected with said latch-mechanism and located on the side of the table.

In witness whereof I have hereunto set my hand this 17th day of May 1909.

CHARLES MOSCH.

Witnesses:
T. A. BRODESSER,
JULIUS MOHR.

Copies of this patent may be obtained for five cents each, by addressing the "Commissioner of Patents, Washington, D. C."